(12) United States Patent
Benthien et al.

(10) Patent No.: US 11,021,225 B2
(45) Date of Patent: Jun. 1, 2021

(54) AIRCRAFT FRAMEWORK ASSEMBLY, AIRCRAFT STRUCTURAL FRAMEWORK AND AIRCRAFT WITH AN AIRCRAFT STRUCTURAL FRAMEWORK

(71) Applicant: AIRBUS OPERATIONS GMBH, Hamburg (DE)

(72) Inventors: Hermann Benthien, Hamburg (DE); Nils Kaiser, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 302 days.

(21) Appl. No.: 16/165,245

(22) Filed: Oct. 19, 2018

(65) Prior Publication Data

US 2019/0127038 A1    May 2, 2019

(30) Foreign Application Priority Data

Oct. 27, 2017    (DE) .................... 10 2017 219 334.4

(51) Int. Cl.
*B64C 1/06*    (2006.01)
*F16B 7/20*    (2006.01)
(Continued)

(52) U.S. Cl.
CPC .............. *B64C 1/061* (2013.01); *B64C 1/069* (2013.01); *F16B 7/182* (2013.01); *F16B 7/20* (2013.01);
(Continued)

(58) Field of Classification Search
CPC ......... B64C 1/061; B64C 1/069; B64C 1/065; B64C 1/064; F16B 7/20; F16B 7/182;
(Continued)

(56) References Cited

U.S. PATENT DOCUMENTS 9,091,387 B2    7/2015    Quintana Rio
9,568,040 B2    2/2017    Gannis
(Continued)

FOREIGN PATENT DOCUMENTS

DE    10 2015 121 018 A1    6/2017
EP         2 766 533 B1    3/2017
(Continued)

OTHER PUBLICATIONS

Interview Summary for European Application No. 18200875.5 dated Dec. 20, 2019.
(Continued)

*Primary Examiner* — Valentina Xavier
(74) *Attorney, Agent, or Firm* — Jenkins, Wilson, Taylor & Hunt, P.A.

(57) ABSTRACT

A pole-shaped aircraft framework assembly including a first plug-and-turn connector forming a first end, a second plug-and-turn connector forming a second end, the second end opposite the first end, a first rod extending from the first plug-and-turn connector towards the second plug-and-turn connector, and a coupling component coupled to the second plug-and-turn connector for detachable coupling with the first rod. The first rod has a circumferential outer surface including alternately on a circumferential path in a cross-sectional plane of the first rod a ridged section and a plain section. The coupling component includes a tubular part having a circumferential inner surface including alternately on a circumferential path in a cross-sectional plane of the tubular part at least one ridged section and at least one plain section. One of the first rod and the coupling component is rotatable relative to the other one, engaging respective ridges of the first rod and the coupling component.

15 Claims, 10 Drawing Sheets

(51) Int. Cl.
*F16B 7/18* (2006.01)
*B33Y 80/00* (2015.01)
*F16B 5/02* (2006.01)
*F16B 37/08* (2006.01)

(52) U.S. Cl.
CPC .............. *B33Y 80/00* (2014.12); *B64C 1/064* (2013.01); *B64C 1/065* (2013.01); *F16B 5/0233* (2013.01); *F16B 37/085* (2013.01); *F16C 2326/43* (2013.01)

(58) Field of Classification Search
CPC .. F16B 5/0233; F16B 37/085; F16C 2326/43; F16C 7/02; B33Y 80/00
See application file for complete search history.

(56) References Cited

U.S. PATENT DOCUMENTS

| | | |
|---|---|---|
| 2009/0218777 A1 | 9/2009 | Wood |
| 2017/0058959 A1* | 3/2017 | Benthien .................. B64C 1/08 |
| 2017/0130766 A1* | 5/2017 | Benthien ................ E04C 3/291 |
| 2017/0159700 A1* | 6/2017 | Stahl ......................... F16C 7/06 |
| 2017/0235062 A1 | 8/2017 | Nielson |
| 2018/0323493 A1* | 11/2018 | Taptic .................. H01Q 1/1228 |
| 2018/0363689 A1* | 12/2018 | Richter .................... F16B 7/20 |

FOREIGN PATENT DOCUMENTS

| | | |
|---|---|---|
| EP | 3 135 833 A1 | 3/2017 |
| EP | 3 254 951 A1 | 12/2017 |
| FR | 2 952 146 A1 | 5/2011 |

OTHER PUBLICATIONS

Extended European Search Report for Application No. 18200875.5 dated Apr. 10, 2019.
German Search Report for German Application No. 10 2017 219 334.4 dated Feb. 14, 2018.

* cited by examiner

FIG 1
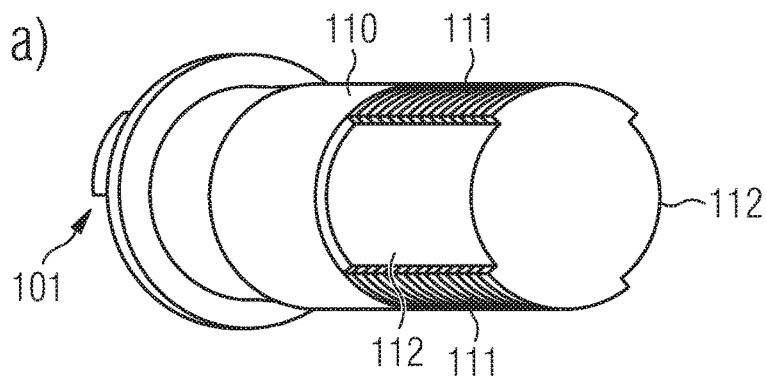
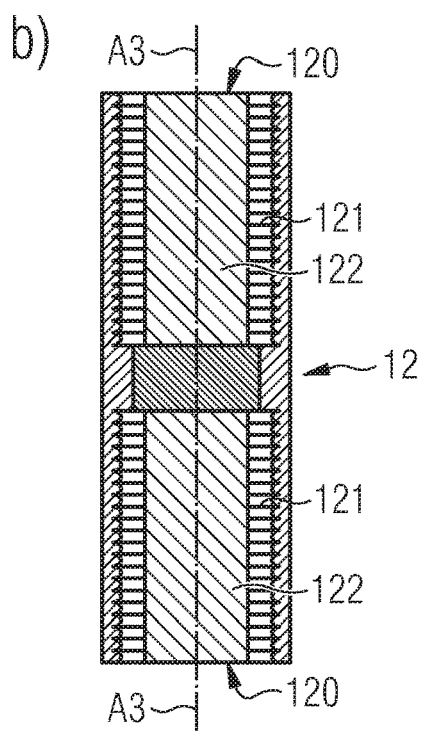
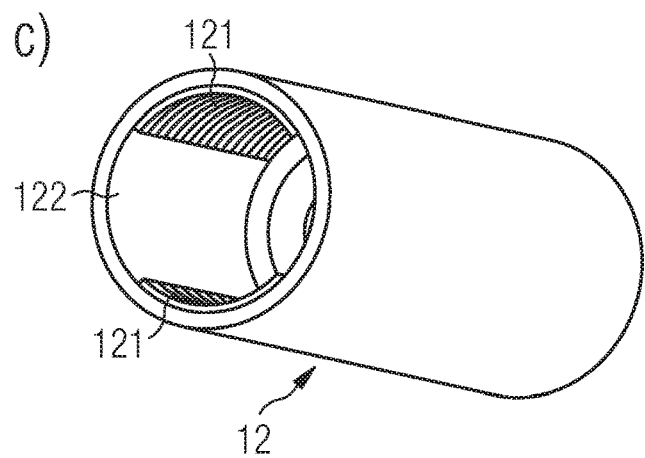

FIG 3
a)
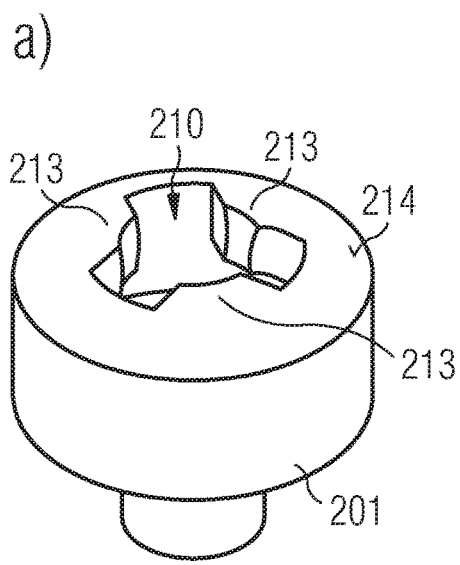
b)
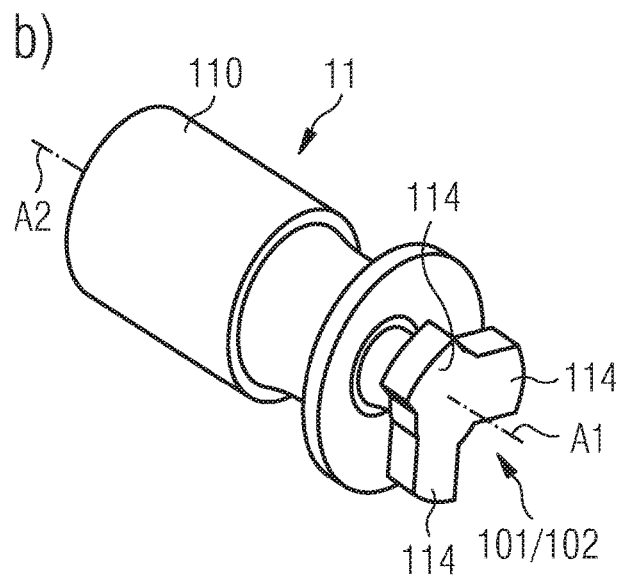
c)
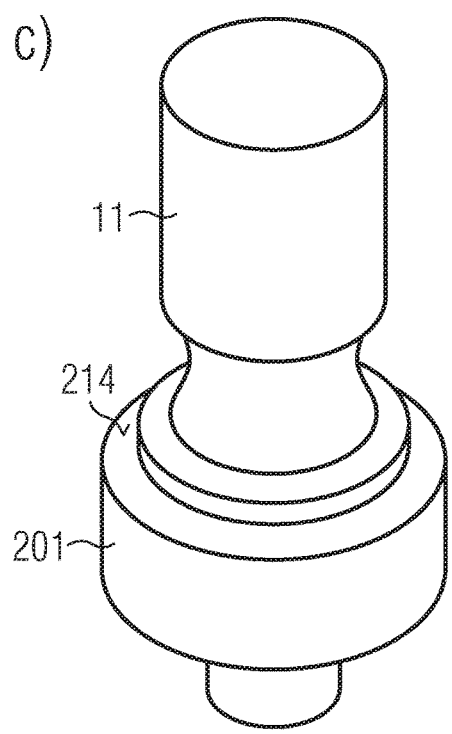
d)
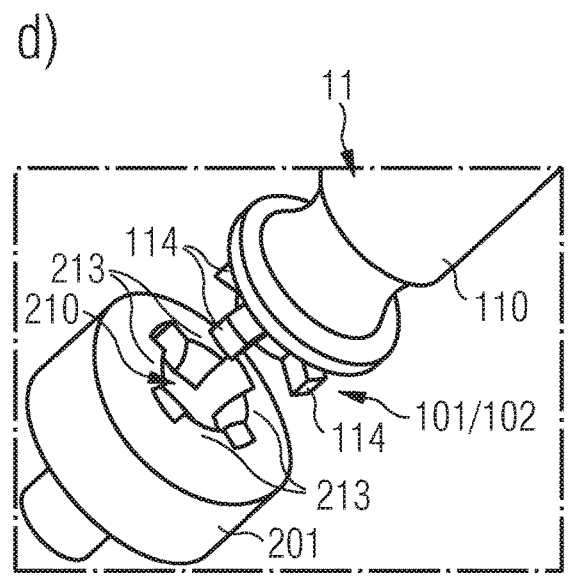

FIG 4
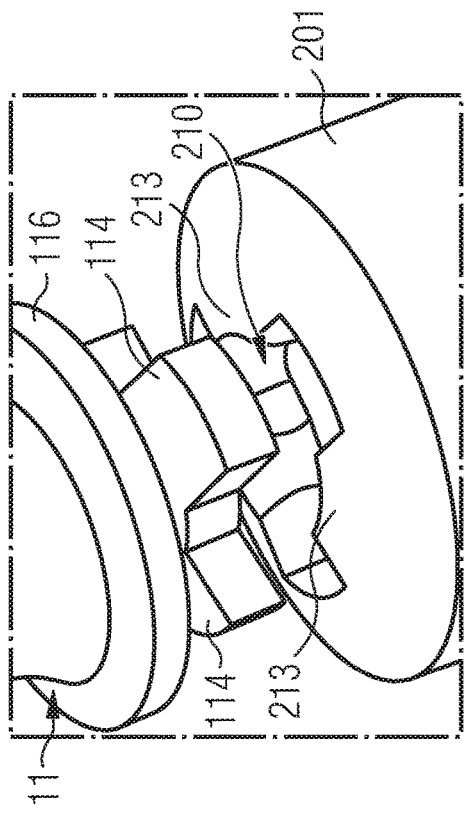
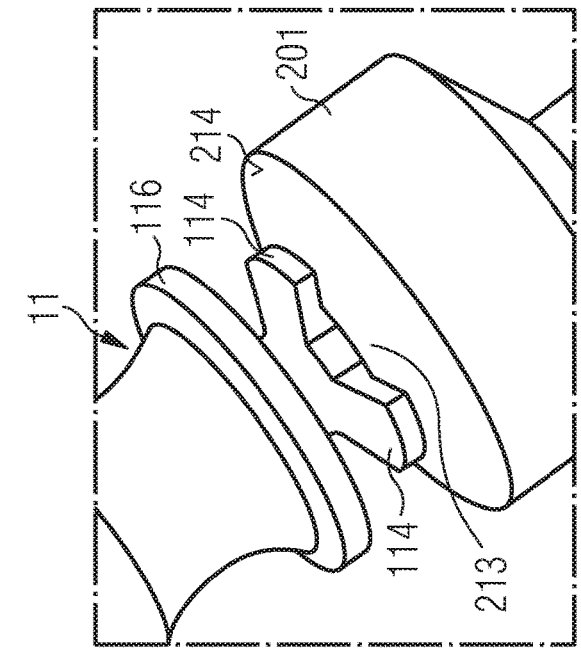
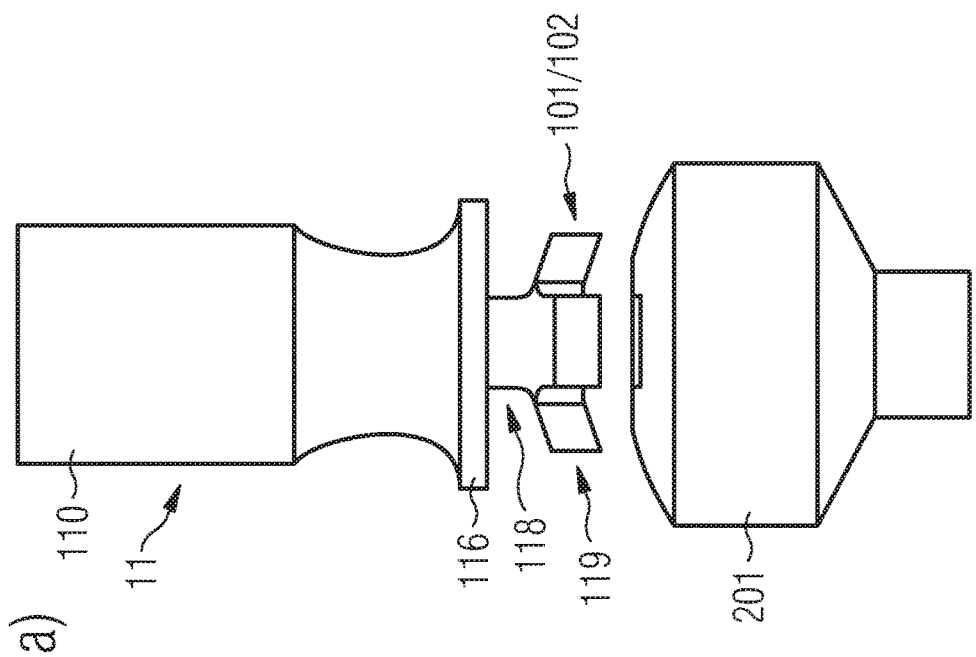

FIG 6
a)
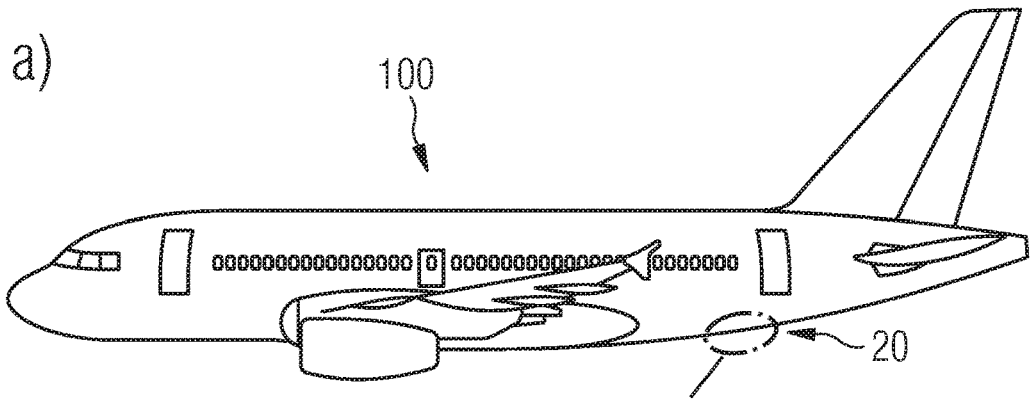
b)
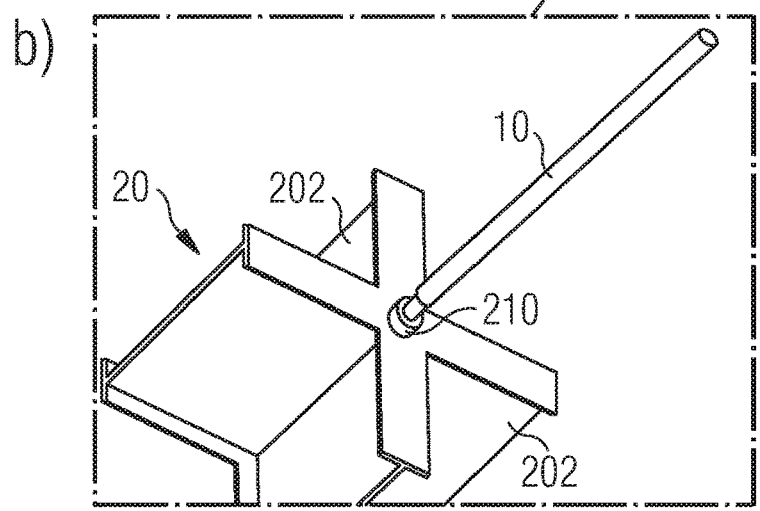
c)
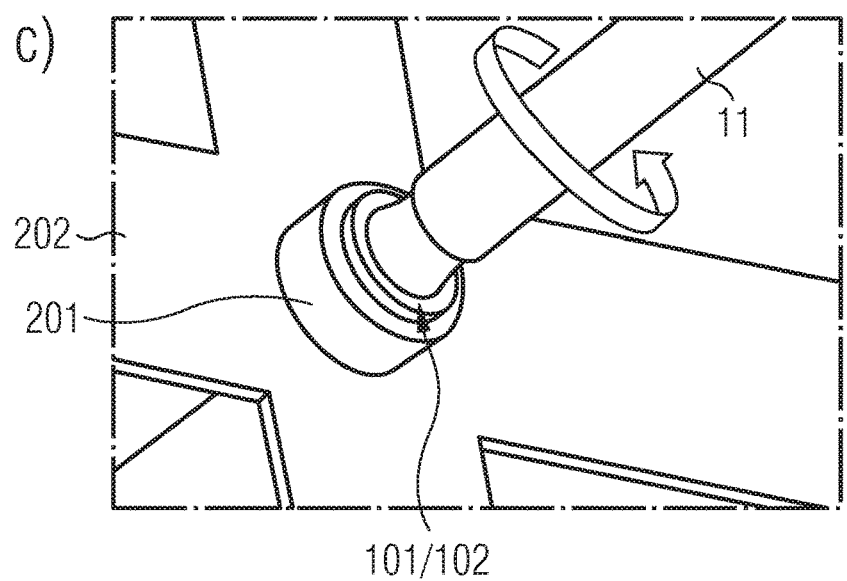

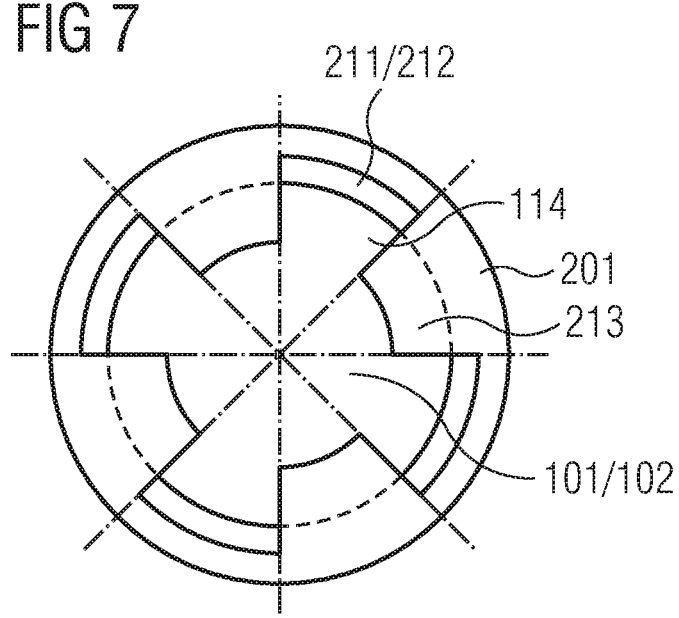
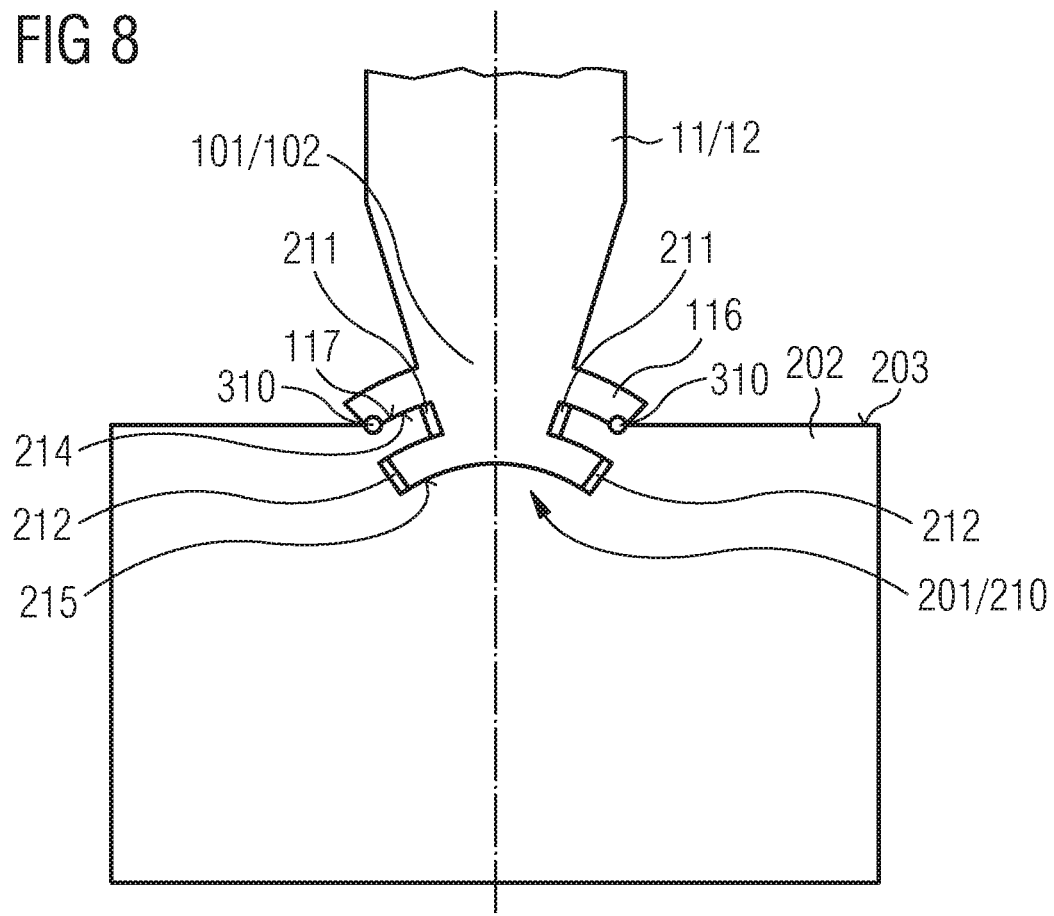

FIG 10
a)
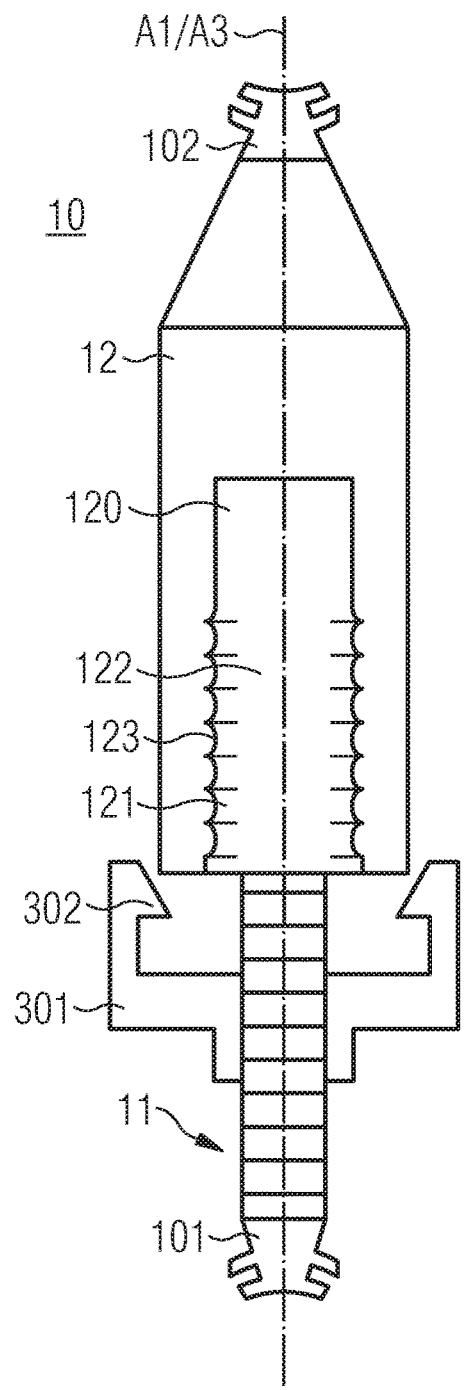
b)
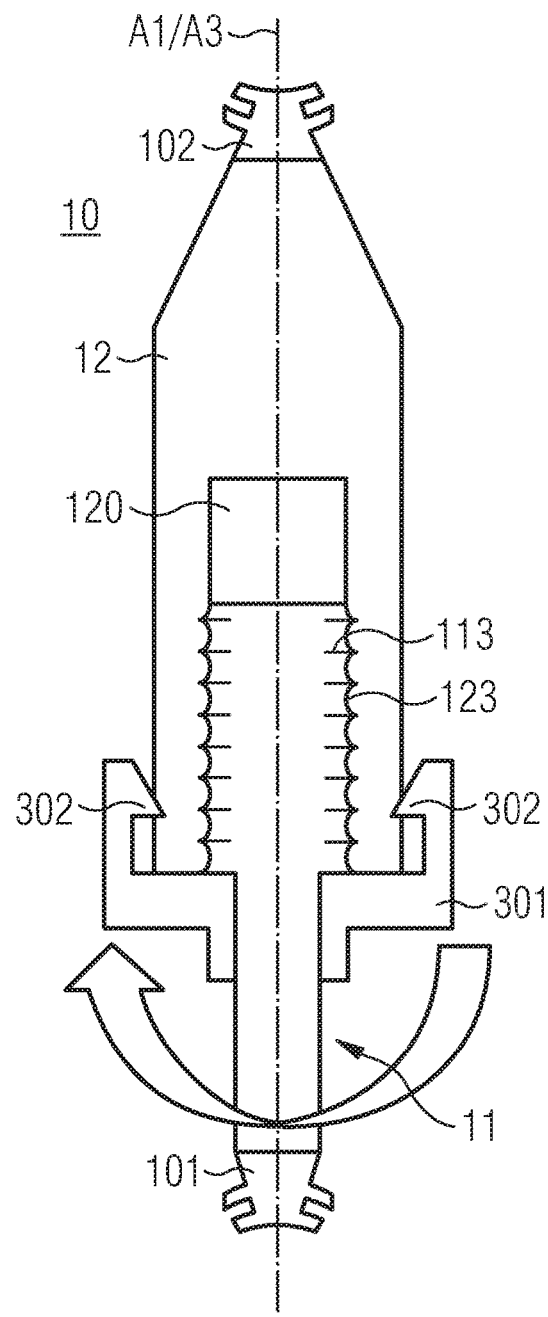

AIRCRAFT FRAMEWORK ASSEMBLY, AIRCRAFT STRUCTURAL FRAMEWORK AND AIRCRAFT WITH AN AIRCRAFT STRUCTURAL FRAMEWORK

CROSS-REFERENCE TO RELATED APPLICATION

This application claims priority to German Application DE 10 2017 219 334.4 filed Oct. 27, 2017, the entire disclosure of which is incorporated by reference herein.

TECHNICAL FIELD

The present disclosure relates to an aircraft framework assembly, aircraft structural framework with an aircraft framework assembly and an aircraft with an aircraft structural framework. In particular, the present disclosure relates to a pole-shaped aircraft framework assembly having a variable length, an aircraft structural framework including such pole-shaped aircraft framework assembly, and an aircraft having at least one aircraft structural framework.

BACKGROUND

The manufacturing of a complex structural framework, such as an aircraft, and in particular an aircraft fuselage, requires connecting a plurality of structural components to form the framework. The connecting is normally made with rivets or screws, a plurality of which is required at each connection between two structural components, or by welding or gluing. In addition, a shim or other additional material is required to compensate for tolerances of the structural components and/or unintended distances between two structural components when setting the rivets or screws.

Such manufacturing of a complex structural framework is time-consuming and may lead to internal stress due to non-compensated tolerances.

SUMMARY

Thus, it is an object of the present disclosure to provide a framework assembly and structural framework, which can be built in an easy and fast manner, and to provide an aircraft that can be manufactured in a cost-effective manner.

This object is solved by the disclosure herein.

According to an aspect, a pole-shaped aircraft framework assembly comprises a first plug-and-turn connector forming a first end of the pole-shaped aircraft framework assembly, and a second plug-and-turn connector forming a second end of the pole-shaped aircraft framework assembly, the second end being opposite to the first end. The aircraft framework assembly (simply referred to as a "framework assembly") further comprises a first rod extending from the first plug-and-turn connector towards the second plug-and-turn connector, and a coupling component coupled to the second plug-and-turn connector and configured for detachable coupling with the first rod. Thus, the framework assembly can be fixed to other parts of a framework, such as an aircraft framework, in an easy and fast manner by simply plugging the connectors into the other parts of the framework and turning the connectors for affixation.

A longitudinal direction of the pole-shaped framework assembly is a direction from one end, i.e. to the first plug-and-turn connector, to the opposite end in a lengthwise direction, i.e. the second plug-and-turn connector. A cross section or cross-sectional plane of the pole-shaped framework assembly and, in particular of the first rod, is perpendicularly arranged to the longitudinal direction (or a longitudinal axis) of the first rod.

The first rod has a circumferential outer surface including alternately on a circumferential path in a cross-sectional plane of the first rod at least one ridged section and at least one plain section, wherein each ridged section includes at least one ridge. The circumferential path is the intersecting line of the outer surface of the first rod and a cross section of the first rod. Thus, when following the outer surface of the first rod on the circumferential path, a ridged section is followed by a plain section. More than one ridged section can be present, so that when following the circumferential path completely around the outer surface, a ridged section is followed by a plain section followed by another ridged section etc.

In case the first rod has a circular cross-section, each of the ridged sections and the plain sections corresponds to a circular arc or segment of a circle. The at least one ridge of the ridged section(s) extends over the circular arc, i.e. has the same length as the circular arc. The first rod can have a different cross-sectional shape, such as an ellipse or a rectangle having two opposite curved sides. The ridged section(s) can be arranged at any segment of the circumferential outer surface disrupted by the plain section(s).

Furthermore, the coupling component comprises a tubular part having a circumferential inner surface, wherein the circumferential inner surface includes alternately on a circumferential path in a cross-sectional plane of the tubular part at least one ridged section and at least one plain section, wherein each ridged section includes at least one ridge. As for the first rod, the circumferential path is the intersecting line of the inner surface of the tubular part and a cross section of the tubular part. Thus, when following the inner surface of the tubular part on the circumferential path, a ridged section is followed by a plain section. More than one ridged section can be present, so that when following the circumferential path completely around the inner surface, a ridged section is followed by a plain section followed by another ridged section etc.

The tubular part of the coupling component may have a circular cross-section, so that each of the ridged section and the plain section corresponds to a circular arc or segment of a circle. The at least one ridge of the ridged section(s) extends over the circular arc, i.e. has the same length as the circular arc. As with the first rod, the cross-sectional shape of the tubular part can be a different form other than a circle, for example, an ellipse or a rectangle having two opposite curved sides.

The first rod is configured to be inserted, insertable, into the tubular part of the coupling component in a state where a cross-sectional projection of the at least one ridged section of the first rod coincides with a cross-sectional projection of the at least one plain section of the coupling component. In other words, the cross-sectional projection of the first rod including the ridged section(s) does not overlap with a cross-sectional projection of the interior opening of the tubular part. This allows easy insertion of the first rod into the tubular part of the coupling component.

One of the first rod and the coupling component is configured to be rotated relative to the other one of the first rod and the coupling component, thereby engaging respective ridges of the first rod and the coupling component. When inserted, each ridged section of the first rod is located in a corresponding plain section of the coupling component and, hence, next to a ridged section of the coupling component. When performing a rotation of either the first rod or the coupling component, the ridge(s) of the first rod engages with the ridge(s) of the coupling component. When engaged, the ridges of the first rod and the coupling component affix each other. In other words, the engaged ridges of the first rod and the coupling component prevent withdrawing of the first rod from the coupling component.

By inserting the first rod into the tubular part of the coupling component the length of the pole-shaped framework assembly can be adjusted. Since the first rod is capable of moving freely within the tubular part of the coupling component in a longitudinal direction of the framework assembly, any desired length of the framework assembly can be achieved, as long as a ridged section of the first rod can engage with a ridged section of the coupling component by rotating the first rod and/or the coupling component. This provides for a fast and easy building of a framework.

According to a variant, a rotational axis of the first plug-and-turn connector coincides with a central longitudinal axis of the first rod. For instance, when rotating the first rod, in order to couple with the coupling component, the plug-and-turn connector is rotated, too. Thus, the first rod may be used to plug and turn the first plug-and-turn connector.

Additionally or alternatively, a rotational axis of the second plug-and-turn connector coincides with a central longitudinal axis of the coupling component. As with the first rod and the first plug-and-turn connector, rotating the coupling component allows to plug and turn the second plug-and-turn connector coupled to the coupling component.

Furthermore, the first plug-and-turn connector and the first rod can form an integral component of the framework assembly, such as a first longitudinal connector. The second plug-and-turn connector and the coupling component can also form an integral component of the framework assembly, such as a second longitudinal connector. Due to the ridged sections of the first rod and the tubular part of the coupling component the first rod and the coupling component can be mounted to one another at any desired length, i.e. the distance between the first and second plug-and-turn connectors, as long as the ridged sections of the first rod and the coupling component overlap in the longitudinal direction and can engage with one another.

In another variant the framework assembly further comprises a second rod extending from the second plug-and-turn connector towards the first plug-and-turn connector. The second rod can be formed in the same manner as the first rod. Thus, a third longitudinal connector can be formed by the second rod and the second plug-and-turn connector. This allows using the same longitudinal connector at both ends of the framework assembly, so that the number of required components to form the framework assembly can be reduced. Alternatively, longitudinal connectors having different longitudinal lengths can be manufactured, so that framework assemblies can be built at any desired length.

The coupling component can be coupled to the second plug-and-turn connector by detachably coupling with the second rod. For example, the coupling component can have two opposite ends that are formed in the same manner, such as having another tubular part receiving the second rod as for the first rod. According to a variant, the tubular part of the coupling component can extend through the entire coupling component, so that the coupling component forms a connecting bush. Alternatively, the coupling component includes two tubular parts with respective openings at respective opposite ends of the coupling component for receiving respective rods.

According to a variant, the second rod has a circumferential outer surface including alternately on a circumferential path in a cross-sectional plane of the second rod at least one ridged section and at least one plain section, wherein each ridged section includes at least one ridge. The second rod can be configured to be inserted into the tubular part of the coupling component in a state where a cross-sectional projection of the at least one ridged section of the second rod coincides with a cross-sectional projection of the at least one plain section of the coupling component. As with the first rod, at least one of the second rod and the coupling component can be configured to be rotated relative to the other one of the second rod and the coupling component, thereby engaging respective ridges of the second rod and the coupling component.

In other words, if the first rod and the second rod have at least ridged sections of coinciding cross-sectional projections, the coupling component can be rotated to detectably couple to the first rod and the second rod at the same time. This allows building the framework assembly in a very fast and efficient manner, so that manufacturing time and cost of a complex structural framework can be reduced significantly.

Alternatively, the second plug-and-turn connector is fixed to or integrally formed with the coupling component. This leads to a two-part framework assembly, which is easier to handle. For instance, the first rod can be inserted into the tubular part of the coupling component to a maximum extent, the framework assembly can be placed in the right position in a framework including adjusting a length of the framework assembly, and by rotating one of the first rod and the coupling assembly the first rod and the coupling assembly are affixed to one another in a longitudinal direction thereof. For instance, by engaging respective ridges of the first rod and the coupling component, the fixing assembly can be set to the desired length and position.

According to a further variant, the framework assembly can further comprise a securing element preventing a relative movement between the first rod and the coupling component. It is to be understood that the securing element can also prevent a relative movement between the second rod and the coupling component. Alternatively, a further securing element is employed to prevent a relative movement between the second rod and the coupling component.

For example, a securing element can be attached to the first/second rod and/or the coupling component in such a manner, that a relative rotation of the rod and coupling component is prevented. Such a securing element can include one or more protrusions or similar elements, engaging with corresponding recesses in the rod and/or coupling component and capable of transferring loads in a circumferential direction between the securing element and the rod and/or coupling component. Additionally or alternatively, such circumferential loads can be transferred via friction between a surface of the securing element contacting the rod and the coupling component.

In yet another variant, the first plug-and-turn connector and/or the second plug-and-turn connector has at least one fastening element extending in a radial direction being substantially perpendicular to a longitudinal axis of the respective first or second rod. Such fastening element can be any form of protrusion extending in a radial direction from a remainder of the first/second plug-and-turn connector. According to an implementation variant, a plurality of protrusions can form the fastening element.

According to a further implementation variant, at least one of the protrusions extend in a radial direction at a particular angle to the longitudinal axis, the angle being different from 90°. For example, at least one protrusion may extend at an angle between 75 and 90° with respect to the longitudinal axis of the first/second rod. Thus, the outermost end of the fastening element lies in a different cross-sectional plane (perpendicular to the longitudinal axis) than the root of the fastening element, which is closer to a central longitudinal axis of the first/second plug-and-turn connector.

Due to the ridges formed on the first/second rod (in the following simply referred to as "the rod") and the (respective) tubular part of the coupling component, various lengths of the framework assembly can be achieved. Specifically, depending on the number of ridges arranged on the rod and/or arranged on the tubular part of the coupling component, the rod can be affixed to the coupling component at any desired insertion depth. For instance, if a plurality of ridges are arranged in the longitudinal direction of the rod and/or the tubular part, the rod can be affixed to the coupling component as soon as a first ridge of the rod can engage with a first ridge of the coupling component. In other words, in the moment the rod has been inserted into tubular part of the coupling component in as much that one ridge of the rod has passed one ridge of the coupling component in a longitudinal direction, an engagement of the two ridges is possible and the rod and coupling component can be affixed to each other. Thus, having a plurality of ridges at the rod and/or coupling component provides for adjusting a length of the framework assembly.

The rotation angle for a full engagement of the ridges of the rod and coupling component depends on the number and/or arc length of the ridged sections of the rod and coupling component. For instance, only one ridged section may be present at the rod and coupling component, which occupies a quarter or a half of the circumferential path of the outer and inner surface of the rod and coupling component, respectively. Thus, at least a quarter or half turn of one of the rod and coupling component is required for a full engagement of the ridges.

It is to be understood that the ridged sections can have any desired size along the outer/inner surface of the rod/coupling component. In case the rod and coupling component have ridges of equal size, their respective length is limited to half the length of the circumferential path of the respective outer/inner surface. Otherwise, the cross-sectional projection of ridged section(s) would overlap and the rod could not be inserted into the coupling component. Moreover, the size of a ridged section of one of the rod and coupling component may be different from the size of a ridged section of the other one of the rod and coupling component. For instance, while the coupling component has one ridged section occupying (almost) three quarter of the inner surface of its tubular part (in a circumferential direction thereof), the rod can have one ridged section occupying (almost) one quarter of its outer surface. Thus, an insertion of the rod and coupling component into each other is still possible, while an engagement is possible over three quarter of the inner surface of the coupling component. This provides for a secure engagement and fixation.

The above outlined sizes of the ridge(s) do not limit the present disclosure. Rather, the ridge(s) of the rod and coupling component can have any size (length along the respective circumferential path), as long as their cross-sectional projections do not overlap.

Furthermore, at least one of the plain section of at least one of the rod and the tubular part of the coupling component can include a recess. The cross-sectional size of such recess can be slightly larger than the cross-sectional size of a corresponding ridged section of the other one of the rod and the coupling component. This provides for an easy insertion, since a small tilting of one of the rod and coupling component does not lead to a blocking of the rod or coupling component before full insertion.

According to an implementation variant, the at least one ridge of the ridged section of the rod and the at least one ridge of the ridge section of the coupling component may have a pitch value of zero. Thus, the ridges of the ridged sections may each be in a plane parallel to a cross-sectional plane of the rod and the tubular part of the coupling component. A framework assembly made of at least one rod and a coupling component both having ridges with a pitch value of zero allow the forming of a framework assembly having a particular length, without creating forces in a longitudinal direction of the framework assembly. This reduces or completely avoids internal stresses in the framework assembly and the resulting framework.

According to another implementation variant, the at least one ridge of the ridged section of the rod and the at least one ridge of the ridged section of the coupling component may have a pitch value greater zero. In other words, each of the ridged sections can form a thread, i.e. a segment of a thread discontinued by the plain section(s). With a pitch value greater zero any desirable length of the framework assembly (distance of the first and second plug-and-turn connectors) can be achieved. When rotating one of the rod and coupling component, corresponding ridged sections start engaging, and when continuing rotating, the extent of insertion of the rod into the tubular part of the coupling component increases due to the positive pitch value. It is to be understood, that a negative pitch value is also possible. In this case the engaging of corresponding ridged sections would provide for coupling the rod and the coupling component and depending on the extent of rotation would further provide for moving the rod out of the tubular section of the coupling component. Thus, depending on the pitch value any desired distance between the first and second plug-and-turn connectors can be achieved. This allows further compensating any tolerances or clearances when employing the framework assembly.

According to a further variation of the fixation assembly, the rod can include at least two ridged sections on the circumferential path in the cross-sectional plane of the rod, wherein the at least one ridge of a first ridged section can be located differently in a longitudinal direction of the rod than the at least one ridge of a second ridged section. In other words, when following the outer surface of the rod in the circumferential path, a first ridged section is followed by a plain section, followed by the second ridged section and followed by a further plain section. It is to be understood that even more than two ridged sections can be arranged on the rod. The ridge(s) of a first ridged section may lie in a plane parallel to a cross-sectional plane of the rod, while the ridge(s) of a second ridged section may lie in a different plane also parallel to the cross-sectional plane of the rod and at a distance to the plane of the ridge(s) of the first ridged section. Thus, there is an offset between the planes, in which the ridges of the first ridged section and the second ridged section are arranged.

The tubular part of the coupling component can then include one ridged section on the circumferential path in the cross-sectional plane of the tubular part. The size of this ridged section of the tubular part corresponds to at least one of the plain sections of the rod. This allows for an engagement of the ridges of the rod and coupling component at different levels of insertion of the rod into the tubular part of the coupling component. Depending on the offset between the ridges of the two ridged sections of the rod a coupling between the rod and the coupling component can be achieved with a fine granularity. It is advantageous, if the offset is smaller than the pitch of the ridges, i.e. the distance between two adjacent ridges, since an engagement of the ridges at insertion levels of the rod and coupling component being smaller than the pitch can be achieved.

According to another arrangement, the tubular part of the coupling component can include at least two ridged sections, where the ridge(s) of a first ridged section have an offset in the longitudinal direction of the tubular part to the ridge(s) of a second ridged section. The rod having only one ridged section then allows an engagement of corresponding ridges of the rod and coupling component at a fine granularity, i.e. at smaller insertion levels than the pitch of the ridges.

According to a further variant, the coupling component may comprise at at least one longitudinal end of the tubular part tool attachment configured to receive a tool for rotating the coupling component. For example, the tool attachment may include a nut-shaped outer form or two or more holes provided in a front face or a circumferential surface of the tubular part of the coupling component.

In accordance with another aspect, an aircraft structural framework comprises a framework assembly, at least one structural element, such as an element of an aircraft structure, and at least one attachment element fixed to one of the at least one structural element. The framework assembly can be any framework assembly of the above aspect and variants.

The attachment element has an opening configured to receive the first or second plug-and-turn connector and to hold the first or second plug-and-turn connector in a longitudinal direction of the framework assembly, if the received first or second plug-and-turn connector is turned in the opening by a predetermined degree. Receiving the first or second plug-and-turn connector means that the first/second plug-and-turn connector is moved substantially in the longitudinal direction of the framework assembly, while at least parts of the first/second plug-and-turn connector fit into the opening during this movement.

The opening includes a first section extending in an inserting direction from an outer surface to the structural element (the inserting direction being parallel to the longitudinal direction of the framework assembly). The first section can have a cross-sectional shape (perpendicular to the inserting direction) corresponding to a circumferential outline of the first or second plug-and-turn connector. The circumferential outline of the first or second plug-and-turn connector is the outline of a cross-sectional projection of the front surface of the first or second plug-and-turn connector. The cross-sectional shape of the opening includes at least one protrusion protruding to a central axis of the opening in a direction substantially perpendicular to the inserting direction. Furthermore, the opening includes a second section further extending from the first section in the inserting direction. This second section has a round or square cross-sectional shape with a cross-sectional extension of at least the widest part of the first section. In other words, the opening can have a round or square cross-sectional form (pot-like shape), while in an area bordered by the outer surface of the attachment element (i.e., an area corresponding to the first section) one or more protrusions towards a central axis of the opening are provided. However, the protrusions extend only partially in the insertion direction to the extent of the first section.

Furthermore, the first or second plug-and-turn connector includes a first section extending from the respective first or second rod in a longitudinal direction thereof. The first section of the first or second plug-and-turn connector can have a round or square cross-sectional shape corresponding to the smallest cross-sectional dimension of the first section of the opening. In other words, the first section of the first or second plug-and-turn connector fits through the protrusions arranged in the first part of the opening, even when the first/second plug-and-turn connector is rotated. The first or second plug-and-turn connector includes a second section further extending from the first section in the longitudinal direction. This second section can have an irregular circumferential outline forming at least one fastening element.

The irregular circumferential outline of the first or second plug-and-turn connector can be contemplated as at least one protrusion extending radially away from the central longitudinal axis of the first or second plug-and-turn connector and extending in the longitudinal direction to the extent of the second section. The root(s) of the protrusion(s) is/are located in an area of the first section of the first/second plug-and-turn connector, so that the protrusion(s) also extend radially away from an outer circumferential surface of the first section of the first/second plug-and-turn connector.

A longitudinal extent of the first section of the first or second plug-and-turn connector can be at least a longitudinal extent of the first section of the opening. In other words, when contemplated along the longitudinal axis of the first or second plug-and-turn connector, the first section is long enough to pass through the first section of the opening, i.e. through the innermost area of the protrusion(s) formed in the first section of the opening.

Furthermore, a longitudinal extent of the second section of the opening is at least a longitudinal extent of the second section of the first or second plug-and-turn connector. Thus, the second section of the first or second plug-and-turn connector fits into the second section of the opening. Likewise, a radial extent of the opening in the first and second section of the opening is at least a radial extent of the respective first and second section of the first or second plug-and-turn connector.

In a variant, an extent of the protrusions of the opening in a circumferential direction and/or an extent of the protrusions of the first/second plug-and-turn connector can coincide or at least be similar to an extent of the ridged sections of the rod and/or the coupling component in a circumferential direction. In addition, the number of protrusions may correspond to the number of ridged sections on the rod. Thus, when rotating the rod, the associated first/second plug-and-turn connector can be engaged in the opening of the attachment element and, at the same time, the ridges of the rod and the coupling component can be engaged with one another. Thus, the fixation of the framework assembly to the attachment element simultaneously couples the components of the framework assembly to one another. This reduces the manufacturing time of the aircraft structural framework.

According to a further variant, the aircraft structural framework (simply referred to as a "structural framework") can further comprise a securing element preventing a relative movement between the framework assembly and the attachment element. For example, a securing element can be attached to the first/second plug-and-turn connector or corresponding rod and/or the attachment element in such a manner, that a relative rotation of the plug-and-turn connector and attachment element is prevented. Such a securing element can include one or more protrusions or similar elements, engaging with corresponding recesses in the framework assembly and/or the attachment element and being capable of transferring loads in a circumferential direction between the securing element and the framework assembly and/or attachment element. Additionally or alternatively, such circumferential loads can be transferred via friction between a surface of the securing element contacting the framework assembly and the attachment element. Furthermore, the securing element can cover at least parts of the plug-and-turn connector received in the attachment element and at least parts of the attachment element. This provides for protection of the attachment element at the plug-and-turn connector against negative influences, such as impacts, humidity, water, aggressive fluid, etc.

According to a variant, the at least one attachment element is fixed to the one of the at least one structural element by 3D-printing. For instance, the at least one attachment element can be formed by a printing method directly onto the structural element. Alternatively, the attachment element can be pre-formed and then fixed to the structural element, for example, by welding, gluing or riveting.

In accordance with a further variant, the at least one attachment element is made from an alloy. For example the at least one attachment element can be made from AlMgSc. This allows forming the attachment element by a 3D printing method. In addition, the attachment element made from AlMgSc provides further advantages and properties, such as being a high-strength material, being resistant to water including saltwater and saline solutions, and being a weldable material. Thus, such attachment element can be applied to the structural framework in a very fast manner, so that cost and time during manufacturing of the framework are reduced.

The structural element can be a beam, frame, stringer or any other structural element that forms part of a framework. For instance, the structural elements can be elements of the fuselage of a vehicle, such as an aircraft. Furthermore, the structural element can be formed by extrusion.

Moreover, according to an implementation variant, the structural framework further comprises a structural connector including at least two attachment elements. Such structural connector can be seen as at least two attachment elements mounted to one another, so that a number of framework assemblies up to the number of attachment elements of the structural connector can be connected to one another.

For instance, the first or second plug-and-turn connector is received in a first one of the at least two attachment elements, and a third plug-and-turn connector of a further framework assembly is received in a second one of the at least two attachment elements. Thus, two or more framework assemblies can be coupled, in order to form a skeleton framing.

In a variant thereof, the structural connector is configured to have a fixed or variable angle between respective inserting directions of the at least two attachment elements. A fixed angle between the respective inserting directions provides for a very strong structural connector, in order to achieve reduced tolerances of movement of the attached framework assemblies. A variable angle, on the other hand, increases flexibility of the framework.

In accordance with a further aspect, an aircraft comprises at least one structural framework. The at least one structural framework can be made in accordance with any of the described aspects and variants.

BRIEF DESCRIPTION OF THE DRAWINGS

Preferred embodiments of a framework assembly, a structural framework and an aircraft are described in greater detail with reference to the attached schematic and example drawings in the following, wherein:

FIG. 1 shows (a) a perspective view of a longitudinal connector, (b) a sectional view of a coupling component, and (c) a perspective view of the coupling component;

FIG. 3 shows (a) a perspective view of an attachment element, (b) a perspective view of a longitudinal connector, (c) a perspective view of the longitudinal connector received and hold by the attachment element, and (d) a perspective view of a further variant of a plug-and-turn connector and corresponding attachment element;

FIG. 4 shows (a) a side view of an attachment element and a longitudinal connector, (b) a perspective view of details of a plug-and-turn connector of the longitudinal connector and an opening of the attachment element, and (c) a perspective view of the plug-and-turn connector during insertion into the opening of the attachment element;

FIG. 6 shows (a) a side view of an aircraft having a structural framework, (b) a perspective view of a detail of the structural framework, and (c) a prescriptive view of a detail of a framework assembly mounted to an attachment element of the structural framework;

FIG. 7 shows a schematic illustration of a plan view of an opening of an attachment element receiving a section of a plug-and-turn connector;

FIG. 8 shows a sectional view of an integrated attachment element with a longitudinal connector coupled thereto;

FIG. 10 shows (a) schematically a sectional view of a variant of a framework assembly with a detached longitudinal connector, and (b) schematically a sectional view of the variant of the framework assembly with coupled longitudinal connector.

DETAILED DESCRIPTION

Figure 2:
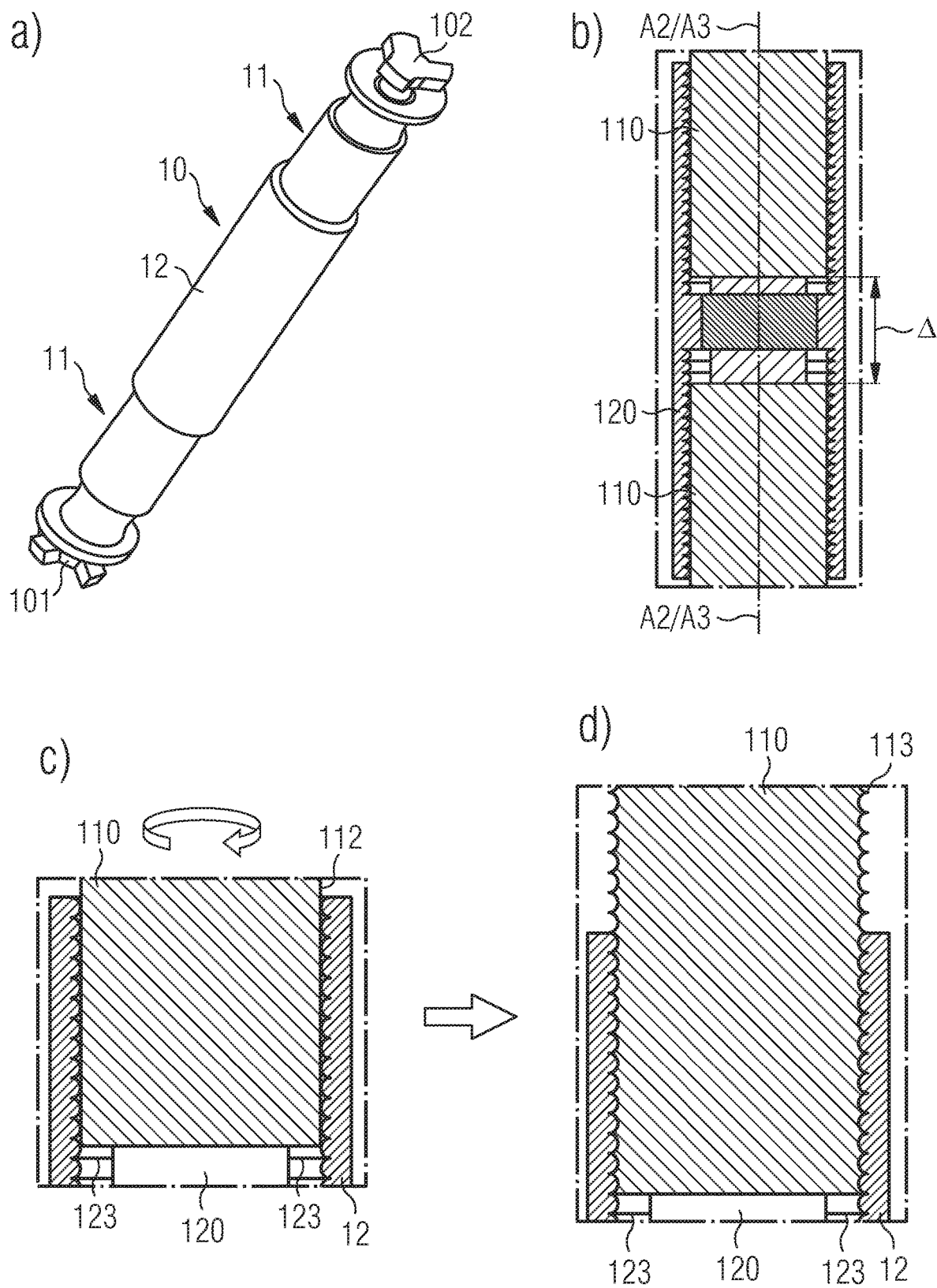
FIG. 2 shows (a) a perspective view of a framework assembly, (b) a sectional view of a coupling component having two longitudinal connectors coupled thereto, (c) a sectional view of a part of a coupling component with a part of a longitudinal connector inserted therein, and (d) a sectional view of the part of the coupling component with the part of the longitudinal connector rotated and coupled to the coupling component.

The following detailed description of the schematic drawings focuses on the illustrated variants and implementations of framework assemblies and structural frameworks. The present disclosure is not limited to the described and illustrated assemblies and frameworks, but includes combinations of the described variants and implementations thereof.

FIG. 1(a) shows a perspective view of a longitudinal connector 11 of a framework assembly 10. The longitudinal connector 11 includes a plug-and-turn connector 101 and a rod 110 extending from the plug-and-turn connector 101 in a longitudinal direction. The rod 110 has a circumferential outer surface including alternately on a circumferential path in a cross-sectional plane of the rod at least one ridged section 111 and at least one plain section 112. Each ridged section 111 includes at least one ridge 113. The ridged section(s) 111 extent in a longitudinal direction on the outer surface, so that a plurality of ridges 113 is arranged parallel to one another.

FIG. 1(b) shows a sectional view of a coupling component 12 of the framework assembly 10. The coupling component 12 comprises a tubular part 120, which can run through the entire length of the coupling component 12 (as illustrated) or may extend only over a part of the coupling component 12 in a longitudinal direction (along a central axis A3 of coupling component 12). The tubular part 120 has a circumferential inner surface including alternately on a circumferential path in a cross-sectional plane of the tubular part 120 at least one ridged section 121 and at least one plain section 122. Each ridged section 121 includes at least one ridge 123. In the direction of the central axis A3 the coupling component 12 may have a single ridged section 121 and single plain section 122. Alternatively, as illustrated in FIG. 1(b) two ridged sections 121 and two plain sections 122 may be arranged on the circumferential inner surface, which are broken by a plain section running around the entire circumferential path in a cross-sectional plane of the tubular part 120.

FIG. 1(c) shows a perspective view of the coupling component 12. As is illustrated in FIG. 1(c), more than one ridged section 121 and more than one plain section 122 can be arranged along the circumferential path in the cross-sectional plane of the tubular part 120. For example, the ridged sections 121 may correspond to the plain sections 112 of the rod 110, so that the rod 110 can be inserted into the tubular part 120 of the coupling component 12 in a state where a cross-sectional projection of the at least one ridged section 111 of the rod 110 coincides with a cross-sectional projection of the at least one plain section 122 of the coupling component 12.

This inserted state is illustrated in FIG. 2(a) showing a perspective view of a framework assembly 10. The framework assembly 10 includes a coupling component 12 and a first longitudinal connector 11 with a first plug-and-turn connector 101. The first longitudinal connector and, in particular its first rod 110, is inserted into a first tubular part 120 of the coupling component 12. On the other end of the coupling component 12 there is a second longitudinal connector 11 with a second plug-and-turn connector 102. The first plug-and-turn connector 101 forms a first end of the pole-shaped framework assembly 10, while the second plug-and-turn connector 102 forms a second end of the pole-shaped framework assembly 10, wherein the second end is opposite to the first end.

FIG. 2(b) shows a sectional view of the coupling component 12 of the framework assembly 10 having two longitudinal connectors 11 coupled thereto. In particular, a first rod 110 of a first longitudinal connector 11 is inserted into one end (tubular part 120) of the coupling component 12, and a second rod 110 of the second longitudinal connector 11 is inserted in the opposite end (tubular part 120) of the coupling component 12. For example, the central axis A3 of the coupling component 12 can coincide with a central axis A2 of the rods 110.

Since the ridged sections 111 of the rods 110 coincide in a cross-sectional projection with the plain sections 122 of the coupling component 12, the rods 110 can be inserted into the coupling component 12 to any desired extent. As illustrated in FIG. 2(b) the upper rod 110 is inserted further into the coupling component 12 than the lower rod 110. Thus, any desired distance A between the upper and lower rod 110 and, hence, any desired distance between the first plug-and-turn connector 101 and second plug-and-turn connector 102 can be achieved. Therefore, the length of the framework assembly 10 can be adapted to any desired extent, as long as the rods 110 have a sufficient overlap with the coupling component 12. A sufficient overlap may be achieved with three or more ridges 113 of the rod 110 engaging with corresponding three or more ridges 123 of the coupling component 12.

The engagement of the ridges 113, 123 can be seen in FIGS. 2(c) and (d) showing a sectional view of a part of a coupling component 12 with a part of a longitudinal connector 11 inserted therein and a sectional view of the part of the coupling component 12 with the part of the longitudinal connector 11 rotated and coupled to the coupling component 12, respectively. In more detail, the rod 110 is arranged with respect to the coupling component 12, so that the at least one plain section 112 of the rod 110 coincides with the at least one ridged section 121 of the coupling component 12. This allows a movement of the rod 110 in a longitudinal direction of the framework assembly 10, i.e. parallel to the central axis A2 of the rod 110. This movement allows adjusting the length of the framework assembly 10, i.e. to achieve the desired distance between the first plug-and-turn connector 101 and the second plug-and-turn connector 102.

When the desired extent of insertion of the rod 110 is achieved, the rod 110 and/or the coupling component 12 can be rotated relative to one another, thereby engaging respective ridges 113 and 123 of the rod 110 and the coupling component 12. This is illustrated in FIG. 2(d) showing the engaged ridges 113, 123. Due to this engagement of the ridges 113, 123, the rod 110 is coupled to the coupling component 12 in a manner that permits movement of the rod 110 in the longitudinal direction of the framework assembly 10.

FIG. 3(a) shows a perspective view of an attachment element 201 forming part of a structural framework. The attachment element 201 has an opening 210 for receiving a plug-and-turn connector 101, 102 shown in more detail in FIG. 3(b) showing a perspective view of a longitudinal connector 11. The opening 210 extends in an inserting direction (top to bottom in FIG. 3(a)) from an outer surface 214 into the attachment element 201. The upper part of the opening 210 (at the outer surface 214) may have a cross-sectional shape corresponding to a circumferential outline of the plug-and-turn connector 101, 102. For example, at least one protrusion 213 may be formed in a direction substantially perpendicular to the inserting direction. The at least one protrusion 213 of the opening 210 may correspond to a recess formed between fastening elements 114 of the plug-and-turn connector 101, 102 as illustrated in FIG. 3(b).

This allows inserting at least parts of the plug-and-turn connector 101, 102 into the opening 210 of the attachment element 201, whereby a fastening element 114 passes through the opening 210 next to the protrusion 213. A rotational axis A1 of the plug-and-turn connector 101, 102 can coincide with a central longitudinal axis A2 of the rod 110. Thus, a rotation of the rod 110 also rotates the fastening element 114 within the opening 210. Turning the plug-and-turn connector 101, 102 in the opening 210 by a predetermined degree brings the fastening element 114 into an overlap position (in a top view along the central longitudinal axis A2 of the rod 110) with the protrusion 213 of the attachment element 201. This provides for holding the plug-and-turn connector 101, 102 in a longitudinal direction of the framework assembly 10 by the attachment element 201, which is illustrated in FIG. 3(c) showing a perspective view of the longitudinal connector 11 received and hold by the attachment element 201. In case of the example illustrated in FIGS. 3(a)-(c) having three fastening elements 114 and three protrusions 213 in opening 210 a sixth of a full turn (i.e., 60°) is required to bring the plug-and-turn connector 101, 102 into a holding position, i.e. bringing the fastening elements 114 into an overlap position with respect to the protrusions 213 of attachment element 201.

A further variant of a plug-and-turn connector 101, 102 and corresponding attachment element 201 separated from one another are illustrated in a perspective view in FIG. 3(d). Here the attachment element 201 has an opening 210 with four protrusions 213 protruding to a central axis of the attachment element 201. Correspondingly, the plug-and-turn connector 101, 102 has four fastening elements 114 sized to fit through the remaining opening 210, i.e. between the protrusions 213 of the attachment element 201. Thus, an eighth of a full turn (i.e., 45°) is required to bring the plug-and-turn connector 101, 102 into a holding position, so that the fastening elements 114 overlap with the protrusions 213 of the attachment element 201.

It is to be understood that the number of fastening elements 114 and protrusions 213 is not restricted to three or four as illustrated. It is likewise possible that the plug-and-turn connector 101, 102 has more or less fastening elements 114, such as one, two, five, six, etc., and the attachment element 201 has a corresponding number of protrusions 213. Furthermore, it is also possible that the number of fastening elements 114 is not equal to the number of protrusions 213 in the attachment element 201. For instance, it is possible that the plug-and-turn connector 101, 102 has less fastening elements 114 than protrusions 213 in the attachment element 201. As long as the location of the fastening element(s) 114 coincides with the remainder of the opening 210 between of the protrusions 213, so that the fastening element(s) 114 can be inserted into the opening 210, and as long as a rotation of the plug-and-turn connector 101, 102 brings the fastening element(s) 114 into an overlap position with (a) protrusion(s) 213, the framework assembly 10 can be attached and mounted to the attachment element 201.

In addition, the attachment element 201 can include within the opening 210 a stopping element (not shown). Such stopping element can prevent the plug-and-turn connector 101, 102 from being rotated further than the overlap position, thereby avoiding releasing the plug-and-turn connector 101, 102 from the attachment element 201 by rotating the plug-and-turn connector 101, 102 more than the required predetermined degree. Such stopping element can be achieved by a protrusion protruding parallel to the longitudinal axis of the attachment element 101 within the opening, so that a fastening element 114 abuts against the stopping element after being rotated by the predetermined degree.

FIG. 4(a) shows a side view of an attachment element 201 and a longitudinal connector 11 in a separated state. The plug-and-turn connector 101, 102 includes a first section 118 extending from the rod 110 in a longitudinal direction thereof (i.e., parallel to central axis A2). The first section 118 has a round or square cross-sectional shape corresponding to the smallest cross-sectional dimension of the opening 210 at the protrusion 213. The plug-and-turn connector 101, 102 includes a second section 119 further extending from the first section 118 in the longitudinal direction. The second section 119 has an irregular circumferential outline thereby forming the at least one fastening element 114.

FIG. 4(b) shows a perspective view of details of the plug-and-turn connector 101, 102 of the longitudinal connector 11 and the opening 210 of the attachment element 201. In particular, FIG. 4(b) shows a perspective view of the longitudinal connector 11 and the attachment element 201, where the plug-and-turn connector 101, 102 of the longitudinal connector 11 is aligned with the opening 210 of the attachment element 201. In other words, the cross-sectional projection of a front face of the plug-and-turn connector 101, 102 is brought into an overlapping state with the opening 210. In this overlapping state, the plug-and-turn connector 101, 102 can be inserted into the opening 210, which is illustrated in FIG. 4(c) showing a perspective view of the plug-and-turn connector 101, 102 during insertion into the opening 210 of the attachment element 201.

Figure 5:
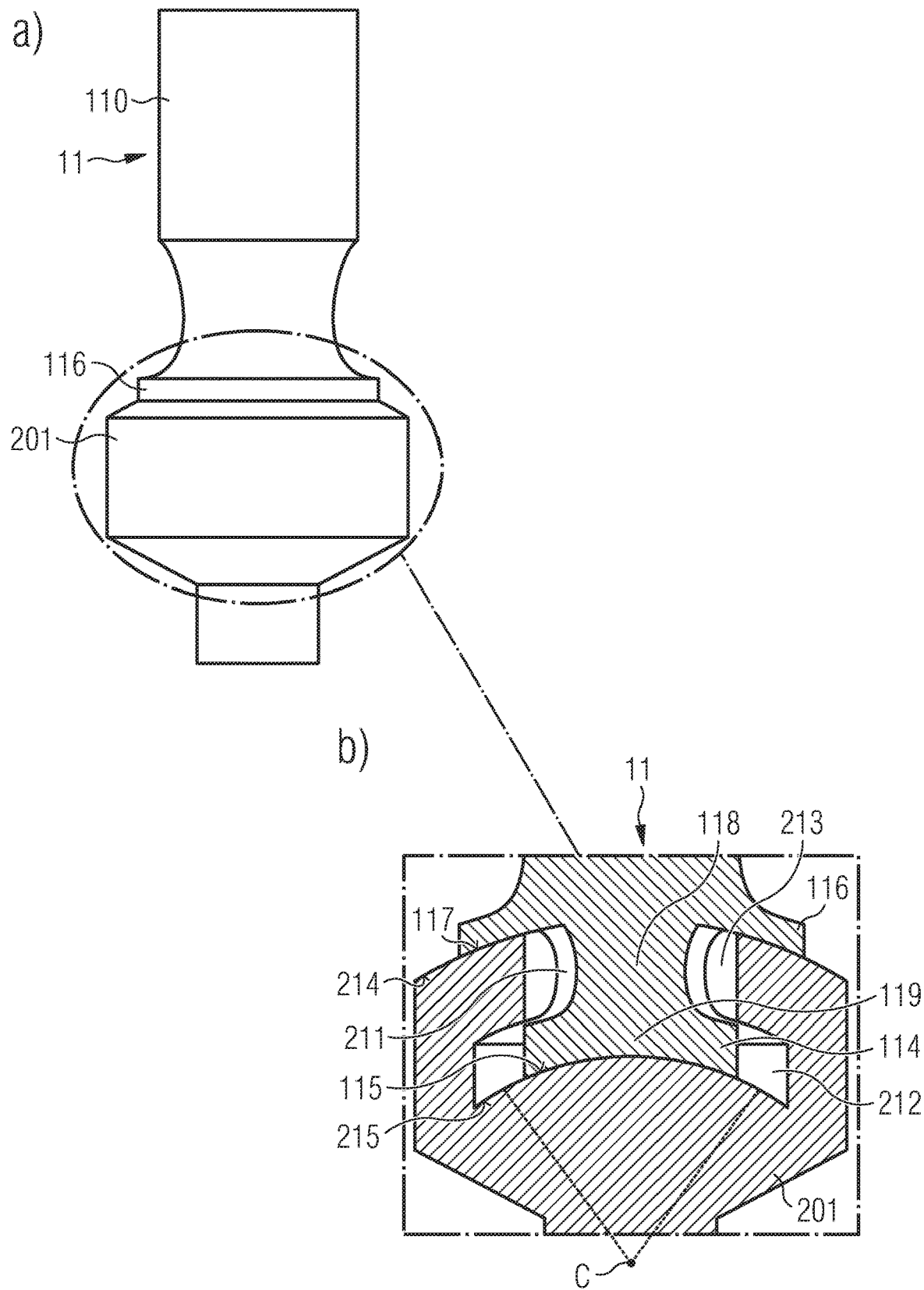
FIG. 5 shows (a) a side view of the longitudinal connector being inserted into the opening of the attachment element, and (b) a sectional view of the plug-and-turn connector and the attachment element when coupled to one another.

The insertion is completed, when an abutting element 116 of the plug-and-turn connector 101, 102 abuts the outer surface 214 of the attachment element 201, which is illustrated in FIG. 5(a) showing a side view of the longitudinal connector 11 being inserted into the opening 210 of the attachment element 201. A cross-section of this state is illustrated in FIG. 5(b) showing a sectional view of the plug-and-turn connector 101, 102 and the attachment element 201 when coupled to one another.

In more detail, a surface 117 of the abutting element 116 abuts the outer surface 214 of the attachment element 201. It is to be understood, that the abutting element 216 may be omitted, in accordance with a variant of the longitudinal connector 11. For instance, an outermost surface 115 of the plug-and-turn connector 101, 102 (a front surface 215 thereof) may abut against an innermost surface 215 of the attachment element 201, so that surface 115 forms an abutting element.

In any case, the first section 118 of the plug-and-turn connector 101, 102 is arranged next to a first section 211 of the opening 210, wherein the first section 211 extends in the inserting direction from the outer surface 214 (downwards in FIG. 5(b)). The first section 211 of the opening 210 has a cross-sectional shape corresponding to the circumferential outline of the plug-and-turn connector 101, 102 as illustrated in FIG. 4(b). The attachment element 201 or its opening 210 includes a second section 212 further extending from the first section 211 in the inserting direction. The second section 212 has a round or square cross-sectional shape with a cross-sectional extension of at least the widest part of the first section 211 of the opening 210. Since the second section 119 of the plug-and-turn connector 101, 102 fits through the opening 210 at its first section 211, the second section 212 of the opening 210 is wide enough for the second section 119 of the plug-and-turn connector 101, 102 to turn around the rotational axis A1 of the plug-and-turn connector 101, 102.

As is further illustrated in FIG. 5(b), the outer surface 214 and/or innermost surface 215 of the attachment element 201 can have a round or spherical shape. In addition, the abutting surface 117 and/or outermost surface 115 of the plug-and-turn connector 101, 102 can have a round or spherical shape corresponding to the surface 214/215 of the attachment element 201. This provides for a degree of freedom of the longitudinal connector 11 and, hence, the framework assembly 10 around a central point C. Thus, a ball joint can be formed by the attachment element 201 and the plug-and-turn connector 101, 102. The protrusion(s) 213 and/or an extent of the plug-and-turn connector 101, 102 at its first section 118 in a radial direction can limit the movement of the framework assembly 10, around the central point C.

Alternatively, the surfaces 115, 117 of the plug-and-turn connector 101, 102 and/or the surfaces 214, 215 of the attachment element 201 can be a flat. According to a further variant, the protrusion(s) 213 of the attachment element 201 may extend in a radial direction in as much, that a circumferential outer surface of the plug-and-turn connector 101, 102 at its first section 118 abuts against the protrusion(s) 213, so that a movement of the longitudinal connector 11 and the framework assembly 10 is hindered.

FIG. 6(a) shows a perspective view of an aircraft 100 having a structural framework 20, which is schematically shown in part in FIG. 6(b) as a perspective view of a detail of the structural framework 20. The structural framework 20 includes at least one structural element 202, such as extruded beams, struts, formers, frames, stringers, etc. The attachment element 201 can be fixed to one of the structural elements 202, for example by welding, riveting or a 3D-printing method. Alternatively, the attachment element 201 can be integrally formed with at least one of the structural elements 202.

The structural framework 20 is formed by connecting a framework assembly 10 to the structural element 202. This is accomplished by receiving in the opening 210 of the attachment element 201 a plug-and-turn connector 101, 102 of the framework assembly 10, as it is illustrated in FIG. 6(c), and turning the plug-and-turn connector 101, 102 in the opening 210 to a holding state corresponding to the sequence illustrated in FIGS. 4 and 5. In this holding state, the fastening element(s) 114 of the plug-and-turn connector 101, 102 is/are arranged in an overlapping manner with the protrusion(s) 213 of the attachment element 201, so that the framework assembly 10 is hold by the attachment element 201 at least in the longitudinal direction of the framework assembly 10.

FIG. 7 shows a schematic illustration of a plan view of an opening 210 of an attachment element 201 receiving a second section 119 of a plug-and-turn connector 101, 102. The plan view includes only the second section 119 of the plug-and-turn connector 101, 102, in order to illustrate the interrelation of the first section 211 of the attachment element 201 and the second section 119 of the plug-and-turn connector 101, 102. The plan view illustrated in FIG. 7 corresponds to the state of the structural assembly 20 shown in FIG. 4(c).

The plug-and-turn connector 101, 102 includes four fastening elements 114 that are received in the first section 211 of the opening 210, wherein the fastening element 114 pass through recesses formed between four protrusions 213 of the attachment element 201. As can be seen from the example illustrated in FIG. 7, the second section 212 of the opening 210 is wider in a radial direction, so that the plug-and-turn connector 101, 102 can move to a certain extent within opening 210. Subsequent to the state illustrated in FIG. 7 and when the plug-and-turn connector 101, 102 is fully inserted into the opening 210 (see FIG. 5(b)), the fastening elements 114 can be brought into an overlap position (dashed line) overlapping with the protrusions 213 of the attachment element 201 by rotation of the plug-and-turn connector 101, 102.

FIG. 8 shows a sectional view of an integrated attachment element 201 with a longitudinal connector 11 coupled thereto. The integrated attachment element 201 can be part of the structural element 202. In other words, an integrated attachment element 201 can be formed in a structural element 202 by providing an opening 210. In case the abutting surfaces 214, 215 of the opening 210 are not flat, as illustrated in FIG. 8, at least parts of the structural element 202 may extend away from a surface 203 of the structural element 202, thereby forming the first and second portions 211, 212 of the opening 210 and the abutting surface 214.

FIG. 8 additionally illustrates a sealant 310 provided between the abutting surface 214 of the attachment element 201 and the abutting surface 117 of the plug-and-turn connector 101, 102. This sealant 310 prevents humidity and water from entering into the opening 210. Thus, corrosion and other damages of the structural element 202 due to humidity or water can be prevented. In addition, the sealant 310 can further form a securing element preventing a rotation of the longitudinal connector 11 when coupled to the integrated attachment element 201. For instance, due to friction achieved by the sealant 310 between the longitudinal connector 11 and the attachment element 201, the longitudinal connector 11 is prevented from rotation and, hence, from releasing the plug-and-turn connector 101, 102 from the attachment element 201.

FIG. 9(a) shows schematically a sectional view of a framework assembly 10 with two detached longitudinal connectors 11. The framework assembly 10 includes a coupling component 12 having a tubular part 120 extending through the entire length of the coupling component 12. The tubular part 120 has at least two ridged sections 121 in a longitudinal direction thereof.

The longitudinal connectors 11 can be inserted into the tubular part 120 of the coupling component 12 from both sides, wherein ridged sections (not shown) of the longitudinal connectors 11 coincide with plain sections 122 of the coupling component 12.

FIG. 9(b) shows schematically a sectional view of the framework assembly 10 with coupled longitudinal connectors 11. After inserting the longitudinal connectors 11 into the coupling component 12, the longitudinal connectors 11 and/or the coupling component 12 can be turned, so that ridges 113 of ridged sections 111 of the longitudinal connectors 11 engage with ridges 123 of the coupling component 12. In this state the longitudinal connectors 11 are hindered from moving in a longitudinal direction of the framework assembly 10.

In order to avoid a rotational movement of the longitudinal connectors 11 or the coupling component 12, which would bring the rigid 113, 123 out of engagement, the framework assembly 10 includes a securing element 301. The securing element 301 can be provided for each longitudinal connector 11 and prevents a relative movement between the rod 110 of the longitudinal connectors 11 and the coupling component 12. For example, the securing element 301 may have protrusions, which engage with corresponding recesses (not shown) at the coupling component 12 to prevent a rotational movement of the securing element 301 with respect to the coupling component 12. Additionally, corresponding structure(s) for preventing a rotational movement between the securing element 301 and the longitudinal connector 11 is/are provided at a section of the securing element 301 engaging with the longitudinal connector 11. For instance, a cross-section of the longitudinal carrier 11 and the securing element 301 may have irregular corresponding circumferential surfaces in a cross-sectional plane, so that respective protrusion(s) and recess(es) (not shown) are formed.

FIG. 10(a) shows schematically a sectional view of a variant of a framework assembly 10 with a detached longitudinal connector 11. Compared to the framework assembly 10 illustrated in FIG. 9, the framework assembly 10 of FIG.

10 has a coupling component 12 with a tubular part 120 that ends in a longitudinal direction in the coupling component 12. At an opposite end of the coupling component 12, the second plug-and-turn connector 102 is fixed to or integrally formed with the coupling component 12.

Figure 9:
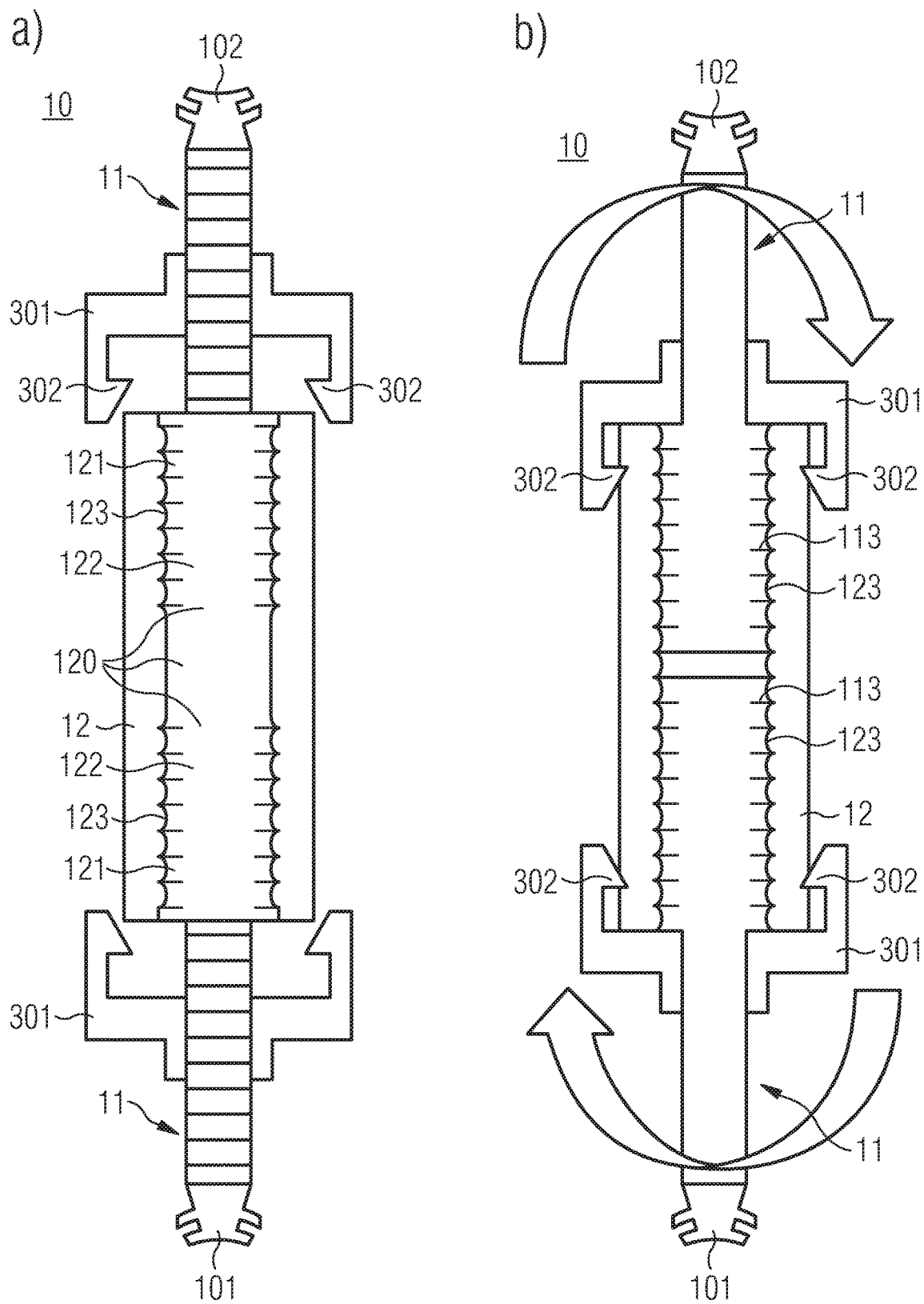
FIG. 9 shows (a) schematically a sectional view of a framework assembly with two detached longitudinal connectors, and (b) schematically a sectional view of the framework assembly with coupled longitudinal connectors.

The functionality of the first longitudinal connector 11 (illustrated at the bottom part of FIG. 10) and the coupling component 12 is identical to the functionality illustrated with respect to FIG. 9. The only difference is, that only one longitudinal connector 11 has to be rotated relative to the coupling component 12, for engaging the respective ridges 113, 123 of the longitudinal connector 11 and coupling component 12 (see FIG. 10(b)). This type of framework assembly 10 is suitable for structural frameworks requiring shorter framework assemblies 10 than compared to the framework assemblies 10 of FIG. 9. The advantage of the framework assembly 10 of FIG. 10 is the reduced number of required components to build the framework assembly 10.

Figure 11:
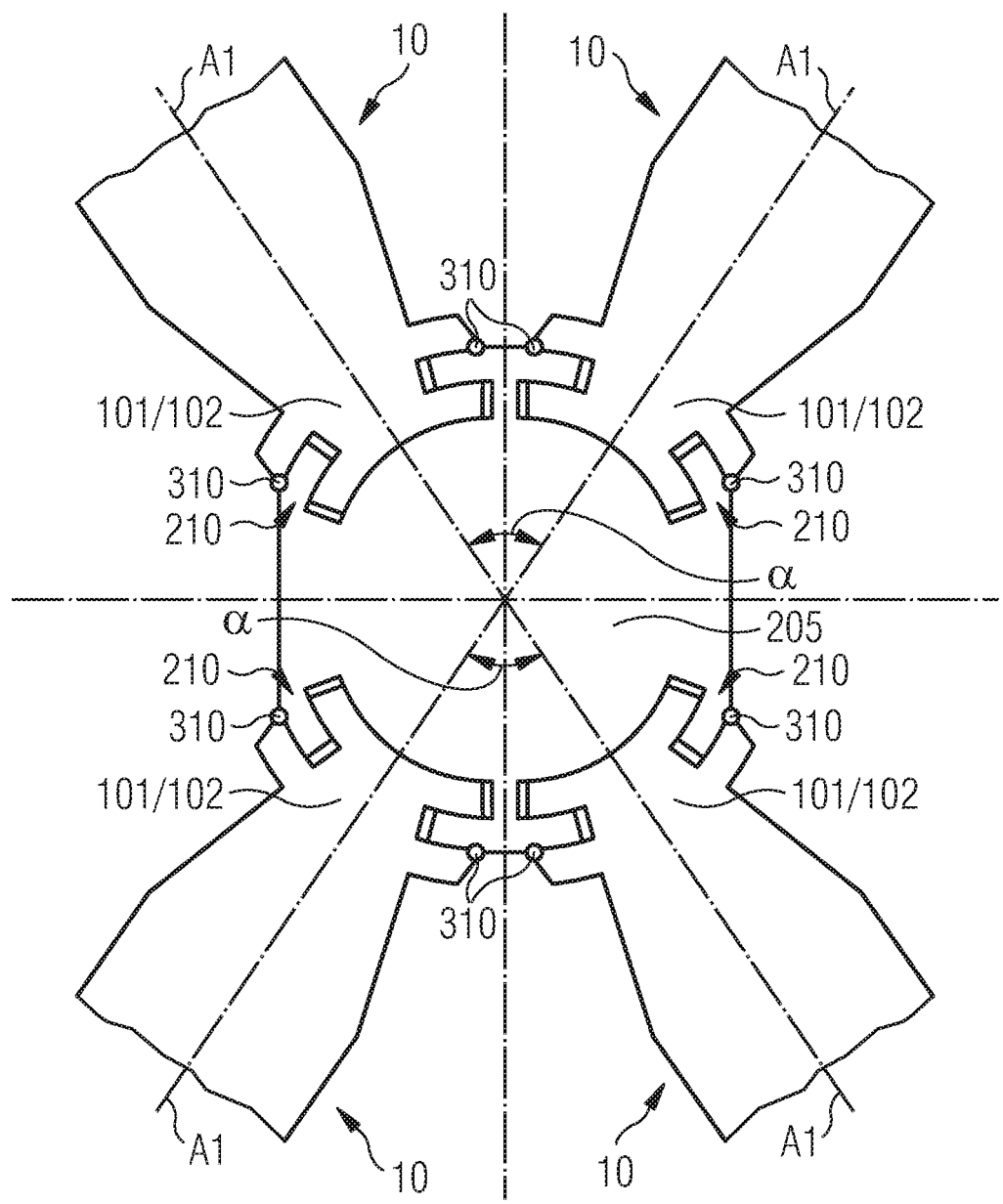
FIG. 11 shows schematically a sectional view of a structural connector for a structural framework.

FIG. 11 shows schematically a sectional view of a structural connector 205 for a structural framework 20. The structural connector 205 includes at least two attachment elements 201 or at least the openings 210 corresponding to at least two attachment elements 201. FIG. 11 illustrates a structural connector 205 having four attachment elements 201 combined. However, structural connector 205 can be built that includes any number of openings 210. Each opening 210 is adapted to receive a respective plug-and-turn connector 101, 102. Thus, at least two framework assemblies 10 can be attached to one another.

For example, the inserting directions of the openings 210 may be arranged at an angle α, so that a skeleton framework can be built. This angle between the inserting directions of the openings 210 may be fixed or variable, so that any required skeleton framework can be built.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pole-shaped aircraft framework assembly comprising:
a first plug-and-turn connector forming a first end of the pole-shaped aircraft framework assembly, wherein the first plug-and-turn connector is configured to be received in a first opening of a first attachment element, and wherein the first plug-and-turn connector is configured to be held in a longitudinal direction of the pole-shaped aircraft framework assembly if the first plug-and-turn connector is turned about a first rotational axis in the first opening by a first predetermined degree;
a second plug-and-turn connector forming a second end of the pole-shaped aircraft framework assembly, the second end being opposite the first end, wherein the second plug-and-turn connector is configured to be received in a second opening of a second attachment element, and wherein the second plug-and-turn connector is configured to be held in the longitudinal direction of the pole-shaped aircraft framework assembly if the second plug-and-turn connector is turned about a second rotational axis in the second opening by a second predetermined degree;
a first rod extending from the first plug-and-turn connector towards the second plug-and-turn connector;
a coupling component coupled to the second plug-and-turn connector and configured for detachable coupling with the first rod,
wherein the first rod has a circumferential outer surface including alternately on a circumferential path in a cross-sectional plane of the first rod at least one ridged section and at least one plain section, each ridged section includes at least one ridge,
wherein the coupling component comprises a tubular part having a circumferential inner surface, wherein the circumferential inner surface includes alternately on a circumferential path in a cross-sectional plane of the tubular part at least one ridged section and at least one plain section, wherein each ridged section includes at least one ridge,
wherein the first rod is insertable into the tubular part of the coupling component such that a cross-sectional projection of the at least one ridged section of the first rod coincides with a cross-sectional projection of the at least one plain section of the coupling component, and
wherein one of the first rod and the coupling component is rotatable relative to another one of the first rod and the coupling component, thereby engaging respective ridges of the first rod and the coupling component.

2. The aircraft framework assembly according to claim 1, wherein the first rotational axis of the first plug-and-turn connector coincides with a central longitudinal axis of the rod, and/or
wherein the second rotational axis of the second plug-and-turn connector coincides with a central longitudinal axis of the coupling component.

3. The aircraft framework assembly according to claim 1, further comprising:
a second rod extending from the second plug-and-turn connector towards the first plug-and-turn connector,
wherein the coupling component is coupled to the second plug-and-turn connector by detachably coupling with the second rod.

4. The aircraft framework assembly according to claim 3, wherein the second rod has a circumferential outer surface including alternately on a circumferential path in a cross-sectional plane of the second rod at least one ridged section and at least one plain section, wherein each ridged section includes at least one ridge,
wherein the second rod is insertable into the tubular part of the coupling component such that a cross-sectional projection of the at least one ridged section of the second rod coincides with a cross-sectional projection of the at least one plain section of the coupling component, and
wherein one of the second rod and the coupling component is configured to be rotated relative to another one of the second rod and the coupling component, thereby engaging respective ridges of the second rod and the coupling component.

5. The aircraft framework assembly according to claim 1, wherein the second plug-and-turn connector is fixed to or integrally formed with the coupling component.

6. The aircraft framework assembly according to claim 1, further comprising:
a securing element preventing a relative movement between the first rod and the coupling component.

7. The aircraft framework assembly according to claim 1, wherein the first plug-and-turn connector and/or the second plug-and-turn connector has at least one fastening element extending in a radial direction being substantially perpendicular to a longitudinal axis of the respective first or second rod.

8. An aircraft structural framework comprising:
an aircraft framework assembly comprising:
a first plug-and-turn connector forming a first end of the pole-shaped aircraft framework assembly;
a second plug-and-turn connector forming a second end of the pole-shaped aircraft framework assembly, the second end being opposite the first end;
a first rod extending from the first plug-and-turn connector towards the second plug-and-turn connector;
a coupling component coupled to the second plug-and-turn connector and configured for detachable coupling with the first rod,
wherein the first rod has a circumferential outer surface including alternately on a circumferential path in a cross-sectional plane of the first rod at least one ridged section and at least one plain section, each ridged section includes at least one ridge,
wherein the coupling component comprises a tubular part having a circumferential inner surface, wherein the circumferential inner surface includes alternately on a circumferential path in a cross-sectional plane of the tubular part at least one ridged section and at least one plain section, wherein each ridged section includes at least one ridge,
wherein the first rod is insertable into the tubular part of the coupling component such that a cross-sectional projection of the at least one ridged section of the first rod coincides with a cross-sectional projection of the at least one plain section of the coupling component, and
wherein one of the first rod and the coupling component is rotatable relative to another one of the first rod and the coupling component, thereby engaging respective ridges of the first rod and the coupling component;
at least one structural element; and
at least one attachment element arranged on one of the at least one structural element,
wherein the attachment element has an opening configured to receive the first or second plug-and-turn connector and configured to hold the first or second plug-and-turn connector in a longitudinal direction of the aircraft framework assembly, if the received first or second plug-and-turn connector is turned in the opening by a predetermined degree.

9. The aircraft structural framework according to claim 8, wherein the opening includes a first section extending in an inserting direction from an outer surface to the structural element, the first section having a cross-sectional shape corresponding to a circumferential outline of the first or second plug-and-turn connector, the cross-sectional shape including at least one protrusion protruding in a direction substantially perpendicular to the inserting direction, and wherein the opening includes a second section further extending from the first section in the inserting direction, the second section having a round or square cross-sectional shape with a cross-sectional extension of at least the widest part of the first section, and
wherein the first or second plug-and-turn connector includes a first section extending from the respective first or second rod in a longitudinal direction thereof, the first section of the first or second plug-and-turn connector having a round or square cross-sectional shape corresponding to the smallest cross-sectional dimension of the first section of the opening, and
wherein the first or second plug-and-turn connector includes a second section further extending from the first section in the longitudinal direction, the second section having an irregular circumferential outline forming at least one fastening element.

10. The aircraft structural framework according to claim 9, wherein a longitudinal extent of the first section of the first or second plug-and-turn connector is at least a longitudinal extent of the first section of the opening, and
wherein a longitudinal extent of the second section of the opening is at least a longitudinal extent of the second section of the first or second plug-and-turn connector.

11. The aircraft structural framework according to claim 8, wherein the at least one attachment element is fixed to the one of the at least one structural element by 3D-printing or by 3D-printing that is an FTM printing method.

12. The aircraft structural framework according to claim 8, wherein the at least one attachment element is made from an alloy, in particular from AlMgSc.

13. The aircraft structural framework according to claim 8, further comprising:
a structural connector including at least two attachment elements,
wherein the first or second plug-and-turn connector is received in a first one of the at least two attachment elements, and
wherein a third plug-and-turn connector of a further aircraft framework assembly is received in a second one of the at least two attachment elements, wherein the further aircraft assembly is a pole-shaped aircraft framework assembly comprising:
a first plug-and-turn connector forming a first end of the pole-shaped aircraft framework assembly;
a second plug-and-turn connector forming a second end of the pole-shaped aircraft framework assembly, the second end being opposite the first end;
a first rod extending from the first plug-and-turn connector towards the second plug-and-turn connector;
a coupling component coupled to the second plug-and-turn connector and configured for detachable coupling with the first rod,
wherein the first rod has a circumferential outer surface including alternately on a circumferential path in a cross-sectional plane of the first rod at least one ridged section and at least one plain section, each ridged section includes at least one ridge,
wherein the coupling component comprises a tubular part having a circumferential inner surface, wherein the circumferential inner surface includes alternately on a circumferential path in a cross-sectional plane of the tubular part at least one ridged section and at least one plain section, wherein each ridged section includes at least one ridge,
wherein the first rod is insertable into the tubular part of the coupling component such that a cross-sectional projection of the at least one ridged section of the first rod coincides with a cross-sectional projection of the at least one plain section of the coupling component, and wherein one of the first rod and the coupling component is rotatable relative to another one of the first rod and the coupling component, thereby engaging respective ridges of the first rod and the coupling component.

14. The aircraft structural framework according to claim 13, wherein the structural connector is configured to have a fixed or variable angle between respective inserting directions of the at least two attachment elements.

15. An aircraft comprising at least one aircraft structural framework according to claim 8.

* * * * *